United States Patent
Zaslavsky et al.

(10) Patent No.: US 12,443,531 B1
(45) Date of Patent: Oct. 14, 2025

(54) CROSS SCENARIO FALL THROUGH (XSFT)

(71) Applicant: MORGAN STANLEY SERVICES GROUP INC., New York, NY (US)

(72) Inventors: Dmitry Zaslavsky, Edison, NJ (US); Gjeta Gjyshinca, New York, NY (US); Christopher Andrews, London (GB)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/987,096

(22) Filed: Dec. 19, 2024

(51) Int. Cl.
*G06F 12/0837* (2016.01)
*G06F 9/52* (2006.01)

(52) U.S. Cl.
CPC ............ *G06F 12/0837* (2013.01); *G06F 9/52* (2013.01)

(58) Field of Classification Search
CPC ................................ G06F 9/52; G06F 12/0837
See application file for complete search history.

(56) References Cited

U.S. PATENT DOCUMENTS

2022/0121462 A1 * 4/2022 Belsey ................ G06F 12/0802

* cited by examiner

*Primary Examiner* — Aracelis Ruiz
(74) *Attorney, Agent, or Firm* — Weitzman Law Offices, LLC

(57) ABSTRACT

A method for optimizing cache reuse in a computational system involves assigning unique identifiers to various Tweaks that affect computational outcomes and injecting Nodes with fields that form a bitmask representing these Tweak dependencies. During execution, the system tracks and updates each Node's dependency information, adjusts the cache key based on the actual Tweak dependencies identified, and stores a proxy in the cache for each executed Node within a Scenario. This proxy enables efficient cache reuse by matching with other Scenarios that share overlapping Tweak dependencies.

18 Claims, 8 Drawing Sheets

```
720 ⎰ val n0 = NodeTask {
    ⎱     _deps = long bitmask (b)
          ss = ScenarioStackRoot (empty scenario, no tweaks)
          args = [0]
          nodeTaskInfo = info
    }

725 ⎰ val n1 = NodeTask {
    ⎱     _deps = long bitmask (b)
          ss = ScenarioStackRoot (empty scenario, no tweaks)
          args = [1]
          nodeTaskInfo = info
    }

730 ⎰ val n2 = NodeTask {
    ⎱     deps = long bitmask (a)
          s = ScenarioStackRoot (empty scenario, no tweaks)
          args = [-1]
          nodeTaskInfo = info
    }
```

*Fig. 7*

CROSS SCENARIO FALL THROUGH (XSFT)

FIELD

The present disclosure relates to computing systems, and more particularly, to software caching.

BACKGROUND

Modern computer systems utilize different storage techniques to enhance performance. One such technique is a form of software data caching to allow for reusing of previously computed results to improve efficiency. However, existing systems often fall short in efficiency due to caching mechanisms' inability to effectively identify and utilize dependencies across different execution scenarios, which can lead to sub-optimal performance due to lack of cache reuse even when cached results didn't change between those scenarios.

SUMMARY

The Cross Scenario Fall Through (XSFT) cache policy described herein introduces an advanced method for Tweak dependency tracking within a computer platform, allowing for improved cache reuse even when complete Scenario matches are not present. Here 'Tweak' refers to a change to some data field in the object model, and 'Scenario' refers to a collection of Tweaks. Improved cache reuse is achieved by dynamically adjusting cache keys used for cache lookup based on runtime dependency tracking, thus reducing the Scenario component of the cache key to only those Tweaks that affect the computation result.

Systems using the teachings herein introduces several key features: Tweak dependencies are represented as bitmasks, enabling fast and efficient comparison during cache lookups, and Nodes (a representation of referentially transparent (RT) functions) are cached under proxy entries to avoid redundant execution, with proxy waiter chains facilitating reuse across different Scenarios. Systems incorporating the teachings herein employ cycle detection and recovery to resolve dependencies in execution chains, ensuring seamless cache utilization.

One aspect involves a method for optimizing cache reuse in a computer system. The method involves assigning unique identifiers to a plurality of Tweaks affecting computational outcomes; injecting Nodes with fields forming a bitmask representation of Tweak dependencies; tracking and updating the dependency information of each Node during execution; adjusting a cache key based on the actual Tweak dependencies identified during Node execution; and storing a proxy in the cache for each executed Node under a Scenario, the proxy facilitating cache reuse by matching against other Scenarios with overlapping Tweak dependencies.

Another aspect involves a system for optimizing cache reuse in a computer system. The system involves a computing device comprising at least one processor and non-transitory memory storing first software instructions for a code execution module such that, when the first software instructions are executed by the at least one processor, the at least one processor is configured to: assign unique identifiers to a plurality of Tweaks affecting computational outcomes; inject Nodes with fields forming a bitmask representation of Tweak dependencies; track and update the dependency information of each Node during execution; adjust a cache key based on the actual Tweak dependencies identified during Node execution; and store a proxy in the cache for each executed Node under a Scenario, the proxy facilitating cache reuse by matching against other Scenarios with overlapping Tweak dependencies.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any claim herein or implementation), of which:

FIG. 7 illustrates, in simplified form, an example of the XSFT system that demonstrates the management of cache reuse and task dependencies.

DETAILED DESCRIPTION

Figure 1:
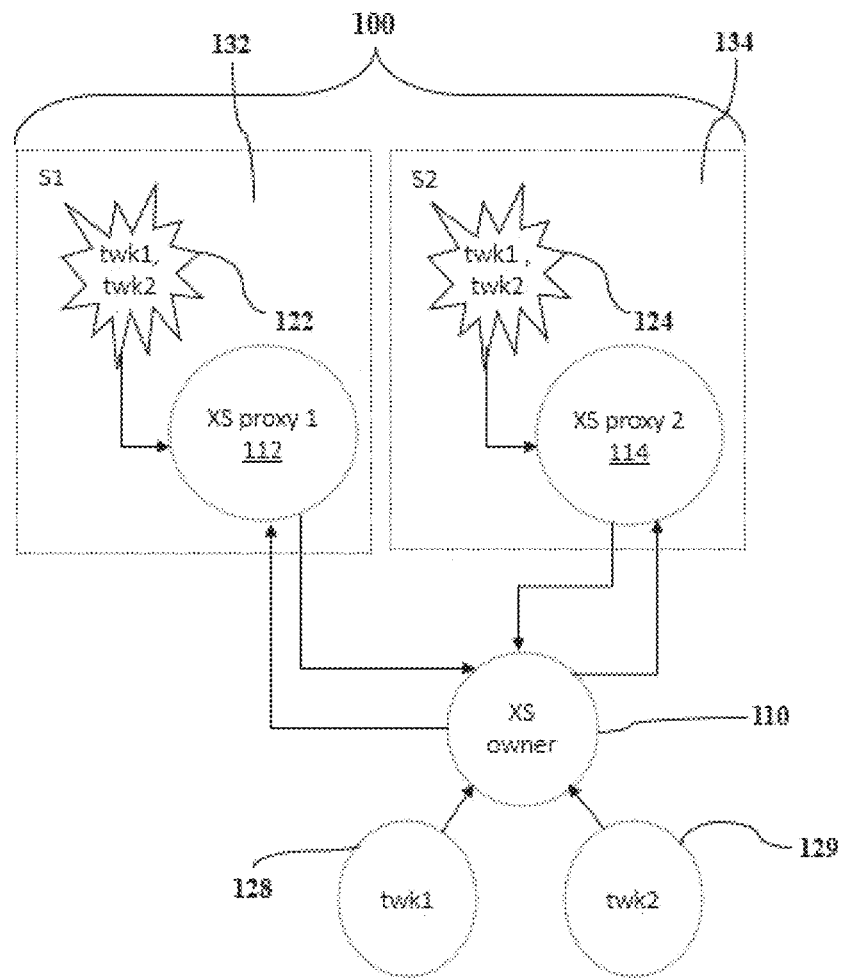
FIG. 1 illustrates, in simplified form, an example of the relationship among different proxies and Scenarios in a system implementing XSFT according to the teachings herein.

In response to the difficulties of managing desired changes to software objects at runtime, an infrastructure may be created to manage a number of developer-defined "Tweaks," or potential/simulated changes to "Nodes," (which is a reusable unit and may include objects, variables and/or data fields, and functions) that do not disturb or recreate existing underlying objects on the heap used by a virtual machine. The infrastructure can be adapted to use any development language or platform through the use of a modified source code editor, code compiler, executing virtual machine, executing interpreter, or other entity of the software development and execution pipeline, specialized to operate with/within the given language or platform.

Scenarios are defined by a series of instructions that begin with a simulated change, tweaking one or more variables. Nodes, representing functions, are linked to a Scenario, indicating the conditions under which they run.

In simplified overview, with our approach a software cache stores the results of RT function calls. These functions are defined as RT with respect to:

a. the function input parameters; and
b. the Scenario (context) in which the function is called.

If (a) and (b) are the same, it is safe to reuse the cached result. A result therefore never becomes 'invalid' and once a result is in cache it is never updated (it may drop out of the cache, on a "Least Recently Used" basis, if the cache is full and it has not been reused recently).

More particularly, a Scenario is a nested data structure in which each Scenario 'frame' contains a set of Tweaks. Each Tweak represents a change to some data field that could affect a function's result. A function has a dependency on a Tweak if it reads that Tweak during its computation. A Tweak may be present in the Scenario (context) in which the function is called, but it may not necessarily affect the result of the function if the Node is not really dependent on the Tweak in question.

When evaluating a function, we read Tweaks in the Scenario starting at the innermost frame. This means that a more deeply nested Tweak referring to the same data field will override a Tweak to the same field on a higher frame in the Scenario. For example, in a function as in the following

```
@node (tweak=true) val a: Int=1
given (a: =2) {
  given (a: =3) {
    println (s"a=$a")
  }
}
``` the output would be "a=3".

With XSFT, the real dependencies of a function call at runtime are tracked by using a bitmask. Dependencies are tracked on the level of the function—for example, if two calls to the same function with two different input parameters end up reading different Tweaks, both Tweaks are traced as dependencies of that function (even though each Tweak is only a dependency of the function when it is called with specific input parameters). While this can lead to some loss of reuse, and is not a requirement, it is a trade-off that is acceptable in most implementations for purposes of performance. In other words, implementations can be created that track dependencies on a more fine-grained basis, but it is to be recognized that those would have a higher memory and runtime cost.

XSFT also stores a placeholder called a "proxy" in cache to represent a cache entry for a function call under a given Scenario. The proxy is responsible for getting a result for the function in that Scenario, either by actually evaluating the function or by waiting for another proxy to compute the same function so it can reuse its result. The proxy is responsible for determining whether it can safely reuse a result from a proxy that represented the same function call under a different Scenario.

A proxy can be entered into cache even for function calls that have not yet completed (i.e., they do not have a result and their full dependency set is not yet known). If a proxy is not complete, other proxies can wait for its result (to avoid double-computation of a function where cache reuse was possible if the system waited for another proxy to complete). Once the function represented by the cached proxy completes, it will offer the result to its "waiters" (i.e., the proxies that are waiting on the result). Each waiter will determine whether it can safely reuse the result or whether it needs to recompute the function, for example, in the case where the cached result was evaluated under a Scenario containing a real dependency of the function, and the waiting proxy is evaluating under a different Scenario where this dependency actually changed.

Before computing an RT function, we query the cache using a cache key composed of:
 a. the function input parameters;
 b. the Scenario; and
 c. the function name.

If the cache key of the query matches the key of an entry already in cache, the cached entry can be reused.

Function calls in different Scenarios may have the potential to be reused if we know the dependencies of the function call. For example, with the following function:

```
@node (tweak=true) val a: Int=1
@node (tweak=true) val b: Int=1
@node def calc (i: Int): Int=a+1
given (a: =2) {//Scenario 1
  calc (1)
}
given (a: =2) {//Scenario 2
  given (b: =3) {
    calc (1)
  }
}
```

The second call to calc will give the same result as the first and therefore the first result can be reused from cache to avoid recomputing calc. In XSFT, the two function calls in the two different Scenarios will happen in parallel. This means that one proxy, under either Scenario 1 or 2, will win the race to actually compute the function and the other will wait to determine whether it can share the result, because this determination can only happen once the function has completed and dependencies are known.

Without XSFT, a cache hit would only be guaranteed if the Scenarios exactly matched that of an entry that was already in cache. However, XSFT includes a mechanism using proxies and waiters to allow reuse even if Scenarios are different. Before a proxy enters itself into cache, it computes a reduced Scenario associated with its cache entry. This reduced Scenario is the minimal Scenario that represents the real dependencies of the computation. In order to compute this minimal Scenario, the proxy needs to compare its Scenario with dependencies tracked for the function it represents. The proxy starts at the innermost (most deeply nested) Scenario frame and reduces the Scenario frame by frame for as long as possible until it reaches a frame that contains a real dependency of its underlying function. In the example above, this means that the second call to calc can be represented by a proxy with a Scenario reduced to:

```
given (a: =2) {//Scenario 2
  calc(1)
}
```

In this example, the function call in Scenario 2 becomes logically equivalent to the call in Scenario 1. The second proxy representing the second call to calc will refer to an identical Scenario as the first call to calc. Because the Scenarios are exactly matching when the cache lookup is performed, it is a cache hit and calc is only computed once.

The above assumes that dependency information about calc is available, because then the frames can be elided to produce a reduced Scenario. However, before anything runs, the system has no dependency information about any function and therefore XSFT must assume that nothing has any dependencies. This means that when the first cache lookup for calc happens, the proxy that is created to be entered into cache will be associated with the 'root' Scenario, representing a context with no Tweaks applied. This is because, under the assumption that calc has no dependencies (because they are not yet known), XSFT can elide all Scenario frames to generate a reduced Scenario. At this point there is a proxy entry in the cache associated with a Scenario that was not yet actually requested by any client code (i.e., there are no calls to calc that happen outside of any Scenario-both calls are in a Scenario represented by a given block). As a result, this proxy won't actually compute the function (since it was not 'requested' by any client code yet). Thus, at this point, this proxy is just a preemptive placeholder in the cache which might provide further reuse later. For simplicity, call this proxy 'proxy-S0'.

Once proxy-S0 is in cache, since no other matching proxy will be found (because, at this point, this was the very first call to calc and, thus, no result for it was computed yet), a proxy associated with Scenario 1 is created and entered into cache. For simplicity, call this proxy 'proxy-S1'. At this point calc actually needs to be computed.

Before evaluation, proxy-S1 finds proxy-S0 in the cache and registers it as a waiter on itself (call this waiter an "up proxy" since it is at a "higher" Scenario, where "higher" means closer to "root", outside of any given blocks). When proxy-S1 completes its computation of calc, the XSFT system will then know the dependencies of calc. and proxy-S1 will offer its result for calc in its Scenario to its waiter, i.e., proxy-S0. But proxy-S0 will find it cannot reuse the result computed by proxy-S1 (since the result of calc in the root Scenario containing no Tweaks is 2, but the result in Scenario 1 (where a: =2) is 3). This is a verification that is similar to Scenario reduction—proxy-S0 will check frame by frame that there is no real dependency change in its Scenario compared to the Scenario of proxy-S1 that offered proxy-S0 the result.

The mechanism of waiting for another proxy to compute a result works in both directions with respect to Scenario frames. In the example above, proxy-S0 is an up-proxy to proxy-S1. However, proxy-S1 may also have "down-proxy" waiters, which represent calls to the function in lower (deeper) Scenario frames. This mechanism enables the parallel execution of multiple calls to calc under different Scenarios, with cache reuse favored over parallel execution. This means that although proxies will be created and entered into cache in parallel, they will wait on each other to determine whether they can reuse a previously computed result. Of course, in the worst case, where no reuse is possible between Scenarios, this might not be a good trade-off because, rather than running calc in all its Scenarios in parallel to compute each result, the proxies will form chains of waiters, each finding that they cannot reuse the offered result, and then be forced to recompute calc in their own Scenarios anyway. However, in the best case, one result can be shared across all Scenarios and the computation of calc only happens once, saving the maximum CPU time. In many cases, it should be recognized, a case somewhere in the middle will result, providing CPU time nevertheless.

The preemptive entry of proxy-S0 in the cache also applies to other Scenario frames closer to the root than the requested proxy's Scenario. For a call to calc under a Scenario with "n" frames, we insert up-proxies that represent calls to calc in frames 0 to n−1. These proxies won't compute calc if it was not requested in any of these Scenarios, but they may receive a result from a down-proxy (since they are registered as up-proxy waiters of other proxies). This increases the chance of a cache hit with an identical Scenario requested later in the application. The requesting proxy will immediately find a matching Scenario in cache and take its result.

However, it will be recognized that the mechanism of proxies waiting on each other can lead to false dependency cycles. By way of example, consider the following example code:
  @node (tweak=true) def twk: Int=1
  @node def bigBrother(i: Int): Int=littleBrother (i)
  @node def littleBrother (i: Int): Int=if (twk <1) 1 else
    given (twk: =0) {bigBrother(i)}

If a call is made to bigBrother(2) outside of any Scenario (so twk=1 to begin with). This expands to the following:
  bigBrother(2)=littleBrother (2)=given (twk: =0) {big-
    Brother(2)}//enter second branch since twk >=1
    =given (twk: =0) {littleBrother (2)}
    =given (twk: =0) {1}//so enters the branch twk <1
    =1

In order to complete the evaluation of bigBrother(BB) in the Scenario without any tweaks (S0) the result of little-Brother (LB) in S0 is needed. To complete that evaluation, the result of BB in the Scenario where twk: =0 (S1) is needed. To complete that evaluation, the result of LB in S1 is needed. Since the proxies try to share results between up and down proxies (as described above) with higher and lower Scenarios, the result is a cycle where: BB-S0 waits for a result from LB-S0, which waits for a result from BB-S1, which waits for a result from BB-S0. Advantageously, this false cycle can be detected in the waiting chain using, for example, the standard Floyd's cycle finding algorithm or Hare-Tortoise algorithm.

When such a cycle is detected, the system can recover by walking the waiting chain and forcing a computation of BB-S1 (i.e., dropping the edge between BB-S1 and BB-S0 that previously optimistically assumed the higher Scenario BB-S0 could be reused, but in the case of a cycle the XSFT approach is to follow a pessimistic approach and force the computation. Once BB-S1 is complete, the dependency of BB-S1 and LB-S1 will then be known to be the Tweak 'twk', so the proxies in the waiting chain can then correctly determine that they cannot reuse results in other Scenarios and therefore should compute instead of waiting. Note that, in most cases, a cycle is only formed before complete information about the dependencies is known because the XSFT system optimistically assumes reuse is possible.

With the foregoing simplified overview, the following provides a more detailed explanation of the XSFT approach.

XSFT, as described herein, is an optimization system and approach that improves cache reuse even when the Scenario is different, as long as the difference does not affect the result of the function.

XSFT, as described herein, is a cache policy that provides Tweak dependency tracking at runtime, information that is then used at cache lookup time to match against Nodes previously cached under different Scenarios.

This match happens by adjusting a cache key so that a Scenario is reduced to a set of Tweaks that were used during computation of the result of a function. In the default caching mechanism, a match occurs only when the Scenario is identical. However, at the point of cache lookup, the XSFT system refines the Scenario to include only the Tweak dependencies of the function, allowing a more flexible comparison while maintaining consistency with the default cache key structure.

In overview, the XSFT approach includes a Tweak dependency tracking function where each Tweak is assigned a unique identifier, and dependencies are recorded using long fields, i.e., fields 64-bits long. The number of long fields assigned at runtime to Nodes is based on the number of Tweaks defined in the system, with each bit representing a unique Tweak. This forms a bitmask indicating the active Tweaks for any given computation. As a function executes, Tweaks that are accessed flip corresponding bits in the Node, and upon completion, dependencies are recorded in a shared data structure, the NodeTaskInfo, across function invocations.

More particularly, dependency tracking is implemented in a way that is fast and lightweight enough to be enabled across all Nodes in the system (potentially billions of function invocations, each represented by a Node). Each Tweak in the system is assigned a unique integer ID. Each Node is injected at runtime with several long fields of 64 bits. Each 64-bit long field injected to the Node represents dependencies on up to 64 Tweaks. Injecting these long fields at runtime (rather than defining them as part of a class) allows control of the additional size of a Node in memory—if the application only defines 64 Tweaks, for example, then only one long field is enough to represent all of a Node's dependencies.

The Node uses a bitmask, where each bit corresponds to a Tweak; where a bit set to 1 indicates that the Node depends on that specific Tweak. As a Node runs and accesses Tweaks, the corresponding bits in the Node are flipped from a zero to 1. Upon completion, the dependencies are recorded in NodeTaskInfo, a shared data structure across all invocations, which is later used during cache lookups to determine if reuse is possible.

In general, IDs are shared between Tweaks in the same class hierarchy. If a child class overrides a Tweak in a base class, then both Tweaks will share the same ID, which can lead to some loss of reuse. For example, this could occur where a Node might depend only on a Tweak in a specific child class, but since the ID is shared between Tweaks in the entire hierarchy, a dependency on ANY Tweak in that hierarchy will be treated as a dependency on ALL Tweaks in the hierarchy.

This simple example illustrates such a situation:
class A {@node (tweak=true) val x: Int=1}//base class
class B extends A {@node (tweak=true) override val x: Int=2}//child class
@node def calc (a: A): Int=a.x+1

In this example, calc depends on Tweak x, so the ID of x must be included in the tweak dependency mask of the Node representing calc. However, calc can be passed an instance of B as an input parameter (since B is an A as class B extends A).

In this case, it is reasonable for A.x and B.x to share the same Tweak ID, so when the classes are initialized either a base class ID that is appropriate will be found (if the base class A was loaded first) or an ID will be set for the child class B and then the ID will be assigned to the base classes (if the child class is loaded first).

This approach applies to all classes within a hierarchy and, it should be understood, extends to any number of classes, not just the two above.

In addition, there is an edge case where a third class might extend two classes that otherwise do not share an inheritance hierarchy. In this case, a marker ID would be assigned to all the Tweaks in the grouping even though they are not in one hierarchy. The marker would indicate that the Tweak represents multiple bits on the bit mask.

For example:
class C {@node (tweak=true) val x: Int=1}
class D {@node (tweak=true) val x: Int=1}
class E extends C with D {@node (tweak=true) override val x: Int=2}

Here C and D have no relationship to each other, so their Tweak IDs for x do not end up the same as in the simple class structure described above.

For this case, a marker value, for example, Integer. MaxValue, is assigned as the tweakable ID for all tweaks "x" in this grouping of classes (which are not all in a hierarchy). This ID of Integer.MaxValue itself is meaningless, it merely serves as a marker to indicate that this tweakable does not represent just one bit in the dependency mask, but rather multiple bits.

In this example, this means that if we take a dependency on any x, the dependency mask will gain 2 bits, not just 1 (representing IDs assigned to C.x and D.x).

Again, this can lead to lost reuse for code that only uses C and D (because they are independent of each other-a dependency on C.x does not logically imply any dependency on D.x, but to ensure correctness in E.x we choose to be pessimistic to avoid false cache reuse).

The system manages operations with 'Tweaked' Nodes by tracking their dependencies at runtime. An alternative implementation would capture these dependencies at compile time using static dependency analysis, encapsulating calls to Tweaks from these Nodes before execution. Either approach allows for generating useful information for better cache reuse at runtime without creating new objects or altering existing ones in memory.

The XSFT approach enhances the executing computer's operation by improving cache efficiency, by focusing on, and improving, how Scenario dependencies are tracked and utilized.

The XSFT approach also includes a cache key adjustment. For example, during cache lookups, the system constructs a reduced Scenario by comparing Tweak dependencies with Scenario frames. This minimizes cache key scope, allowing the system to match previously cached results based on actual Tweak dependencies rather than full Scenario components.

The XSFT approach further includes a proxy and waiter mechanism. For example, upon Node execution, proxy entries are created in the cache to handle requests, in parallel, without redundant executions. These entries form waiter chains where one proxy execution informs others of results, enabling cross-scenario cache reuse.

FIG. 1 illustrates, in simplified form, an example of structural relationships among different proxies and Scenarios within a representative Cross Scenario Fall Through (XSFT) system. As shown, FIG. 1 highlights the interactions between the various components used for optimizing cache reuse in a computer environment, including mechanisms for proxies to share results that are safe to reuse between Scenarios.

The XSFT system 100, which incorporates multiple components, manages the reuse of cached data across different scenarios. The main entity responsible for overseeing the execution of tasks is referred to herein as an XS owner 110. This XS owner 110 manages dependencies and coordinates with proxies 112, 114, referred to as XS proxies, to ensure accurate computation and efficient cache reuse. "XS" refers to Cross Scenario and is a part of the Cross Scenario Fall Through (XSFT) system, which is designed to manage and optimize cache reuse across different computational scenarios. The "XS" in "XS owner" or "XS proxy" denotes components within this system responsible for managing dependencies, coordinating tasks, and ensuring efficient use of cached data across various Scenarios to avoid redundant computations.

In FIG. 1, XS Proxy 1 112 and XS Proxy 2 114 are intermediary placeholders within the system's cache. Each XS proxy 112, 114 maintains results of Nodes along with contextual information, such as the Scenario and Tweak dependencies that influenced the execution of these tasks. XS Proxy 1 112 is associated with a specific Scenario S1 132, while XS Proxy 2 114 is linked to a different Scenario S2 134. These proxies enable the system to avoid redundant computations by reusing previously cached results when similar Scenarios occur. XS Proxy 2 114 handles tasks related to S2 134 and ensures efficient cache reuse for similar Scenarios.

Tweaks 122 and 124 (twk1 and twk2) represent modifications or parameters that impact the outcome of computational tasks and are contained in Scenarios S1 132 and S2 134. Tweaks 128 and 129 (twk1 and twk2) are shown in FIG. 1 as critical inputs directly influencing the result of the computation represented by XS owner 110. Unlike general Tweaks, twk1 and twk2 represent specific dependencies that determine the system's ability to determine when and how to reuse cached result (since there cannot be reuse between Scenarios if real dependencies are different). This refinement is crucial for handling more complex scenarios, ensuring the system adapts dynamically to variations in dependencies while maintaining cache efficiency. In FIG. 1, twk1 and twk2 are shown as inputs that influence Scenarios S1 132 and S2 134, which are critical in determining the dependencies the system must track and manage. Each Tweak can alter the behavior of Nodes, leading to different results that must be stored and reused appropriately by XS proxies 112 and 114.

When a Node is executed under a specific Scenario (e.g., S1 132 or S2 134), the XS owner 110 evaluates the impact of the associated Tweaks 122 and 124 (e.g., twk1, twk2). Based on this evaluation, the XSFT system 100 decides whether to store the result in an XS proxy 112, 114 (e.g., XS Proxy 1, XS Proxy 2) or reuse an existing cached result. The system ensures accurate results are reused across Scenarios with similar but not identical Tweaks.

In operation, the system continuously monitors Scenarios and Tweaks to check if a current Scenario matches any previously stored results in its XS proxies. If a match is found, the system can reuse the cached result, reducing computation time and improving efficiency. If no match is found, or if the scenario includes new or modified Tweaks, the system recalculates the task. The XSFT system dynamically adapts to changes by updating the dependencies as new Tweaks are introduced or as dependencies evolve. This ensures that the system remains efficient and responsive to varying dependencies.

Further, returning to FIG. 1, the XSFT system 100 can efficiently verify if a changeable data field, referred to as a Tweakable Node 110, 128, 129, has been previously tweaked by using two bits in its flags: one for instance-tweaked (a field on a specific instance of an object was tweaked) and one for property-tweaked (the field is tweaked for all instances of a given class). The XSFT system 100's processing logic returns a proxy that will eventually be completed by an XS 'owner' Node, even if multiple matching attempts are necessary. A global counter for Tweaked Nodes increments when a previously untweaked Node is used for the first time to assign a Tweak ID to the Tweakable Node. The Cache ID in a Scenario holds bitwise OR-ed values of all Tweak IDs of tweaked Nodes. The Tweak ID corresponds to the unique integer identifier assigned to each Tweak in the system. The Tweak mask consists of several 64-bit long fields, injected at runtime into Nodes, with each field capable of representing dependencies on up to 64 Tweaks. The K-th property ID's Tweak mask is represented by a single K-th bit in the corresponding 64-bit long field, indicating which Tweaks have been accessed during a computation. Wraparound occurs when the Tweak ID exceeds 64N for a system with N long fields, causing Tweak Mask=1 for Tweak ID=1 and Tweak ID=65 (if N=1).

For example, if more than 128 bits are required, 2 long fields would not be sufficient, while 64×3=192 bits would be sufficient. Therefore, the system allocates 3 long fields, supporting up to 192 Tweaks. If there are only 150 Tweaks in the system, with K-th property IDs ranging from 1 to 150, the remaining bits (192−150=42 bits) might be reserved for other purposes or represent overhead, giving some flexibility in how these fields are used.

The implementation further includes mechanisms for updating the Scenario and XS proxy information as new Tweaks are introduced or dependencies evolve. This dynamic adjustment ensures that the system efficiently tracks changes, enabling continuous optimization of computational performance without concerns about false cache reuse.

Figure 2:
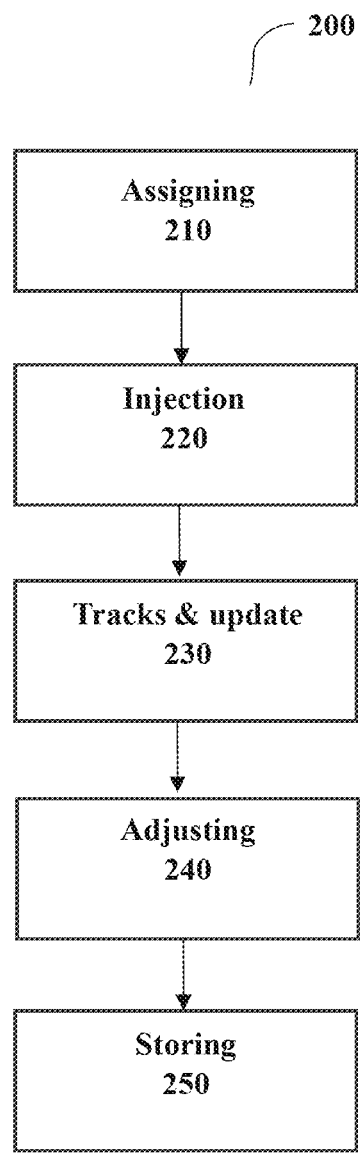
FIG. 2 illustrates, in simplified form, an example flowchart for one example implementation showing how XSFT reuses a Node according to the teachings herein.

FIG. 2 illustrates, in simplified form, an example flowchart for one example implementation of the XSFT process.

The XSFT process begins by assigning (Step 210) unique identifiers to a plurality of Tweaks affecting computational outcomes. Each Tweak is assigned a unique identifier, and dependencies are recorded using 64-bit long fields, which are injected into Nodes at runtime. The number of fields injected is determined by a system property configured to match the number of Tweakables in the model, optimizing memory usage. Next, Nodes are assigned (Step 220) bitmask fields that represent Tweak dependencies, indicating the accessed Tweaks for any given computation. As the function executes, the system tracks and updates (Step 230) the dependency information for each Node. Accessed Tweaks flip corresponding bits in the Node's bitmask, and upon function completion, these dependencies are recorded in NodeTaskInfo, a shared data structure across function invocations.

The process continues with adjusting the cache key (Step 240) based on the actual Tweak dependencies identified during Node execution. During cache lookups, a reduced Scenario is constructed by comparing Tweak dependencies with Scenario frames, minimizing the cache key's scope. This allows the system to match previously cached results based on actual Tweak dependencies rather than full Scenario components. Finally, a proxy is stored (Step 250) in the cache for each executed Node under a Scenario, enabling cache reuse by matching other Scenarios with overlapping Tweak dependencies.

As a result, the XSFT process significantly enhances cache efficiency, reduces redundant computations, and optimizes overall system performance.

Figure 3:
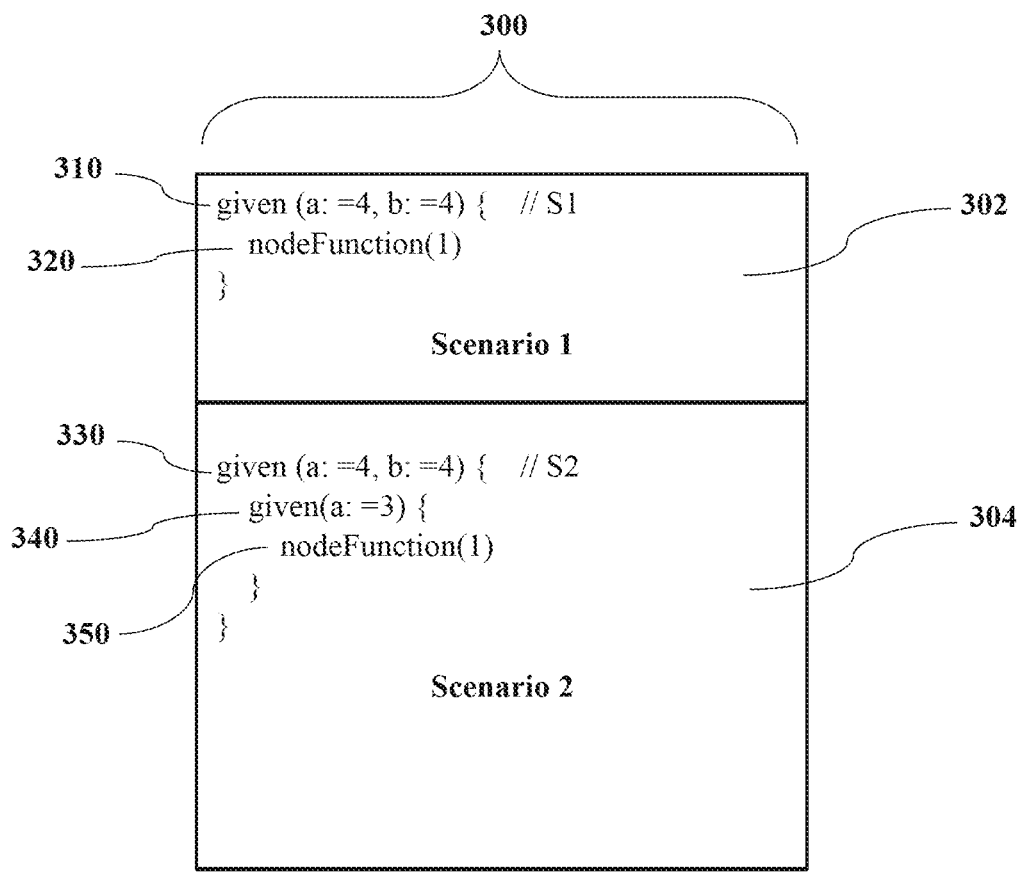
FIG. 3 illustrates, in simplified form, example data structures according to the teachings herein.

FIG. 3 illustrates in simplified form example data structures according to the teachings herein. To further understand how these data structures function in practice, it's essential to examine the detailed mechanics of how functions are invoked and managed within the XSFT system.

As shown in FIG. 3, there are two distinct Scenarios 302 and 304, each representing different sets of Tweaks used during separate function evaluations of some function called 'nodeFunction', each with its own set of parameters and conditions (i.e., two different Scenarios).

Each invocation of a function (i.e., each Node) contains a reference to the identity of the instance of the class on which the function was called, the arguments supplied to the function, and the collection of Tweaks present during the function's evaluation, which are encapsulated in a nested structure called the Scenario. Shared information across all invocations of a given function, such as the function name, is stored in a corresponding data structure called NodeTaskInfo. By default, Nodes are cached using a key that includes the function name, recorded in the NodeTaskInfo data structure. Additionally, the entity's identity, arguments, and Scenario associated with the function are recorded in the Node. Cache reuse is guaranteed only when all these components match between invocations of the function. Functions like nodeFunction 320 and 350 are represented as Nodes, each linked to a Scenario.

This detailed caching strategy ensures that function results are accurately retrieved when all associated components align perfectly between calls. However, this strict matching requirement can lead to unnecessary recomputations, particularly in Scenarios where certain Tweaks do not impact the outcome of the function. In such cases, the system may fail to recognize that previously cached results are still valid, resulting in redundant computations and inefficiencies.

For example, in FIG. 3, there are two calls to nodeFunction 320 and 350, in two different Scenarios 302 and 304. The nodeFunction is defined as "def nodeFunction (i: Int): Int=i+b," meaning its result depends on the value of b, not a. In one call, the function is evaluated in a scenario where a: =4 and b: =4. In the other call, the function is evaluated in a nested scenario where a: =4, b: =4 in the top frame and a: =3 in the inner frame. Without XSFT, the system would recompute nodeFunctions 320 and 350 in both Scenarios 302 and 304 because the entire Scenario forms part of the cache key. Although the parameters of nodeFunction 350 match in both cases, the scenario in which it is evaluated does not, which prevents a cache match.

Under certain conditions, the XSFT system can safely reuse cached results even when the Scenarios differ, provided that the differences do not affect the outcome of the computation. This ability to recognize and utilize opportunities for cache reuse is a key feature of the XSFT system, contributing to its efficiency. In the example above, since the result of nodeFunction 320 and 350 depends only on b and not on a, reusing the cached result would be both appropriate and efficient, as the outcome remains the same across both Scenarios 302 and 304.

When nodeFunction runs for the first time using XSFT, the system determines that the function depends solely on b. As a result, an XSFT proxy is created, which stores both the result and the specific Scenario 302 under which the function was evaluated. This proxy is then cached for future use.

For the cache lookup during the evaluation of Scenario 2 304, the system computes the 'minimum' scenario containing the dependencies for nodeFunction by examining the Scenario and removing frames that do not influence the computation.

In FIG. 3, after the system reduces the Scenario for Scenario 2 304 by removing irrelevant Tweaks, the cache lookup for NodeFunction in Scenario 2 304 becomes effectively equivalent to the lookup in Scenario 1 302. This is because, after the reduction, both Scenarios rely on the same relevant Tweak (b=4).

As a result, once the Scenario for Scenario 2 304 is reduced, the system performs a regular cache lookup by comparing the hash of the reduced Scenario with the stored hash in the cache. If the reduced scenario matches the stored cache entry, the system safely reuses the cached result, improving cache efficiency by avoiding unnecessary recomputation.

Figure 4:
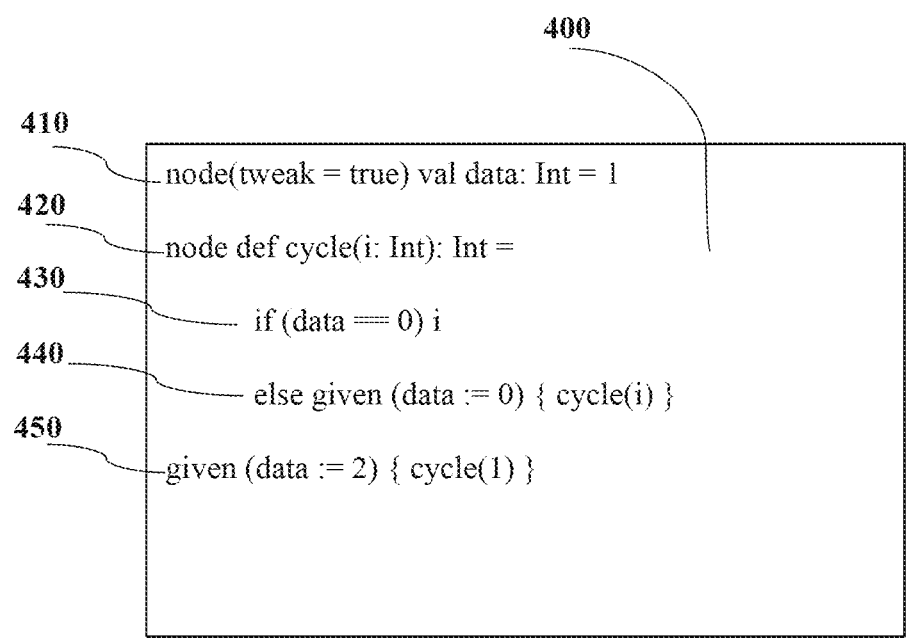
FIG. 4 illustrates a simplified example of code that demonstrates the use of XSFT in accordance with the methods described herein.

FIG. 4 illustrates a simplified example of a cycle 400 that demonstrates the use of the XSFT system in accordance with the methods described herein. The code shown in FIG. 4 provides an example of how the XSFT system manages recursive functions and their dependencies through Tweaks, allowing for optimized function execution based on specific conditions in different scenarios.

The cycle function 400 checks the value of data. If data is 0, it returns the input i; otherwise, it changes data to 0 and recursively calls itself. This introduces a cycle that can create dependencies within the scenario. The purpose is to demonstrate how the system manages and tracks Tweaks over recursive calls.

The Tweak application with a value of 2 450 demonstrates a scenario where the Tweak data is set to 2, and the function cycle (1) is executed. This illustrates how the XSFT system handles Tweaks applied to nodes and tracks how these Tweaks influence the function's execution. The cycle function introduces a recursive loop when the Tweak data is altered, leading to a potential cycle that the system must detect and resolve.

In another scenario, the Tweak data is set to 0, and cycle (1) is executed again. This change to data triggers a different flow in the function's execution, demonstrating how the system manages the impact of Tweaks on the function's behavior. The XSFT system adapts to these changing conditions by tracking Tweaks and adjusting the execution flow or cache usage accordingly.

The cycle detection mechanism in the XSFT system plays a crucial role in managing these dependencies. When a cycle is detected, the system breaks the recursive loop by applying specific rules for resolving dependencies, ensuring that the function can complete without entering infinite loops. This is key to preventing redundant computations and ensuring efficient caching. The result of the cycle function 440 after applying the Tweak with a value of 0 further demonstrates how the XSFT system dynamically adjusts to Scenarios by detecting cycles and recovering from them to maintain efficient performance.

A cycle is created in the XSFT system when different proxies, representing different scenarios, become dependent on each other's completion, leading to a circular wait. In other words, the cycle is a situation where different proxies in the XSFT system are stuck in a circular dependency, each waiting for the other to complete.

Since the system initially has no information about the dependencies of the "cycle" Node, the first request for the Node in the scenario where "data" equals 2 ends up waiting on a helper proxy (ProxyA 410) that represents evaluation in the untweaked root Scenario. This is because, at the start, the system assumes the Node has no dependencies and therefore considers its minimum scenario to be the empty, untweaked root Scenario.

Because the Node hasn't run yet, and there was a request for it in the scenario where "data" equals 2, the proxy for this scenario (ProxyB 450) takes responsibility for the Node's execution. When the Node begins to execute 400, it temporarily records a dependency on the "data" Tweak in the individual Node currently running. These dependencies are later reported to the shared NodeTaskInfo once the Node completes. A scheduler then proceeds to enqueue another "cycle" Node for execution in the scenario stack where "data" equals 0 (ProxyC 430). However, since this execution doesn't yet know about the dependency on the Tweak (as dependencies are only reported after the Node completes), it ends up waiting on the proxy representing evaluation in the untweaked root Scenario (ProxyA 410). ProxyA 410, in turn, is waiting for the completion of ProxyB 450, the proxy in the scenario stack where "data" equals 2. This creates a cycle.

The scheduler detects such cycles by running cycle detection algorithms on waiter chains when the system "stalls," meaning no thread can make progress. This is part of the process to identify work that can be done safely without causing deadlocks. The cycle detection identifies the cycle described above, and a recovery mechanism is used to resolve it. During recovery, the NodeTaskInfo is updated with any Tweak dependency information learned from the execution of the individual Nodes in the waiting chain. The link between the second execution in the scenario where "data" equals 0 (ProxyC 430) and the execution in the root Scenario (ProxyA 410) is then broken. This is because the system now recognizes the dependency on the "data" Tweak, preventing reuse between ProxyA 410 and ProxyC 430. As a result, two separate executions of the Node in the two relevant Scenarios can now complete successfully.

Figure 5:
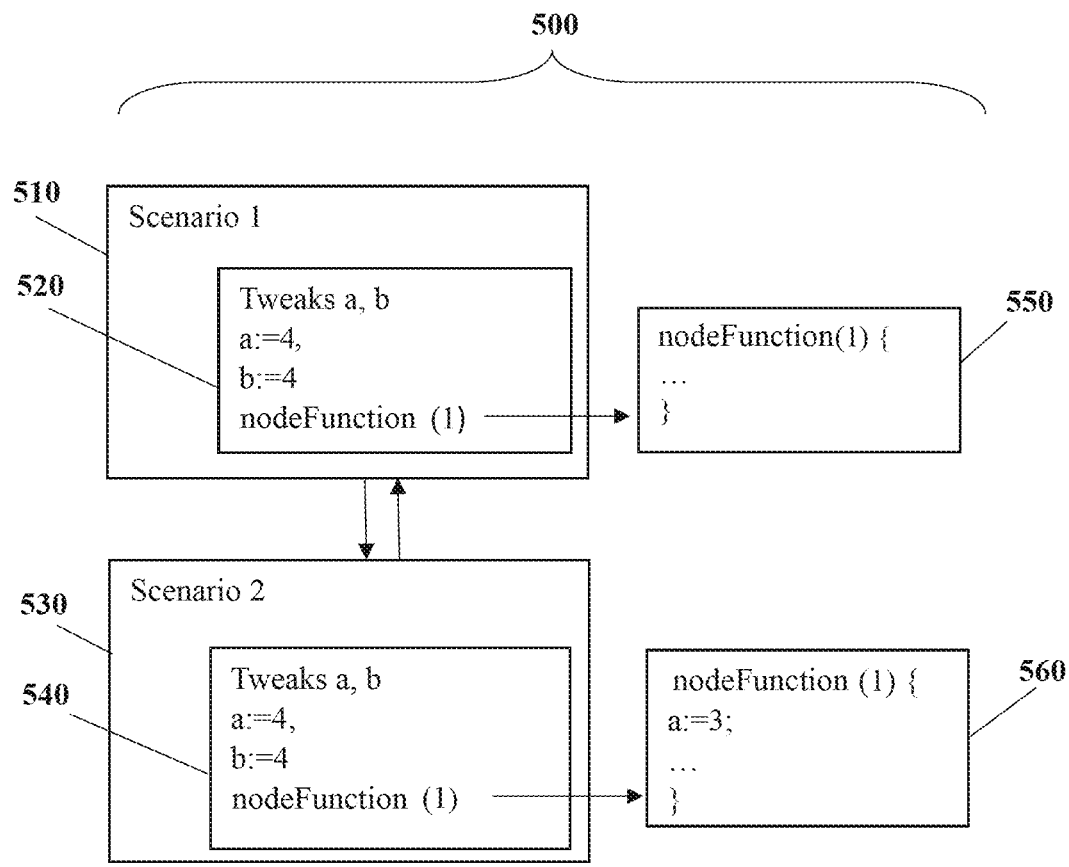
FIG. 5 illustrates, in simplified form, another example of data structures according to the teachings herein.

FIG. 5 illustrates in simplified form another example of data structures according to the teachings herein. Building on the insights from FIG. 5, this example further shows how the XSFT system manages Tweak dependencies and optimizes function evaluations across different Scenarios.

In Scenario 1 510, the system evaluates the nodeFunction with Tweaks where a: =4 and b: =4. The XSFT system represents these Tweaks using bitmasks, and records that only the Tweak to b influences the result of the nodeFunction. In Scenario 2 530, while the initial conditions are the same as Scenario 1 (with a: =4 and b: =4), an additional nested Tweak where a: =3 is introduced. The XSFT system uses bitmasks to track dependencies, recognizing that b: =4 continues to influence the result of the NodeFunction, while a: =3 does not. When the nodeFunction is executed, it produces the same result as in Scenario 1.

The XSFT system then compares the results from Scenario 1 and Scenario 2. It identifies that both Scenarios lead to the same output, despite the additional Tweak in Scenario 2. Because the additional Tweak did not alter the result, the system reuses the cached result of the nodeFunction between Scenario 1 and Scenario 2, optimizing computation by avoiding unnecessary re-evaluation.

The diagram in FIG. 5 visually represents how the XSFT system processes various scenarios, applies bitmasks to assess Tweak dependencies, and determines whether Scenarios can be reused based on their computed outcomes. This approach enhances efficiency by reducing redundant computations when identical results can be obtained under different scenarios.

The XSFT system introduces a new approach to optimizing cache reuse by focusing on real Tweak dependencies during runtime. This method optimizes caching, particularly in scenarios where a full Scenario match is not required. By dynamically adjusting cache keys based on the dependencies identified during execution, XSFT ensures that only relevant Tweaks influencing the computation are considered, thus improving cache efficiency.

The effectiveness of the XSFT system is driven by several key features. First, Tweak dependencies are represented as bitmasks, which allows for fast and efficient comparisons during cache lookups. This enables the system to reduce the Scenario to only the critical Tweaks that affect the computation, minimizing the cache key's scope. Second, Nodes are cached under proxy entries, which act as placeholders to prevent redundant execution. These proxies are linked via waiter chains, enabling the reuse of Nodes across different Scenarios and further optimizing computational efficiency.

Beyond enhancing cache reuse, the XSFT system incorporates mechanisms for cycle detection and recovery. These mechanisms ensure that execution dependencies do not lead to deadlocks or inefficiencies. By dynamically resolving dependencies, the system maintains smooth cache usage, even in complex Scenarios where multiple Tweaks may influence the result.

Through these features, XSFT addresses the challenge of optimizing cache reuse in computational systems. By focusing on actual Tweak dependencies rather than requiring complete Scenario matches, XSFT improves both the efficiency and reliability of cache utilization, ensuring more effective use of computational resources across different scenarios.

Figure 6:
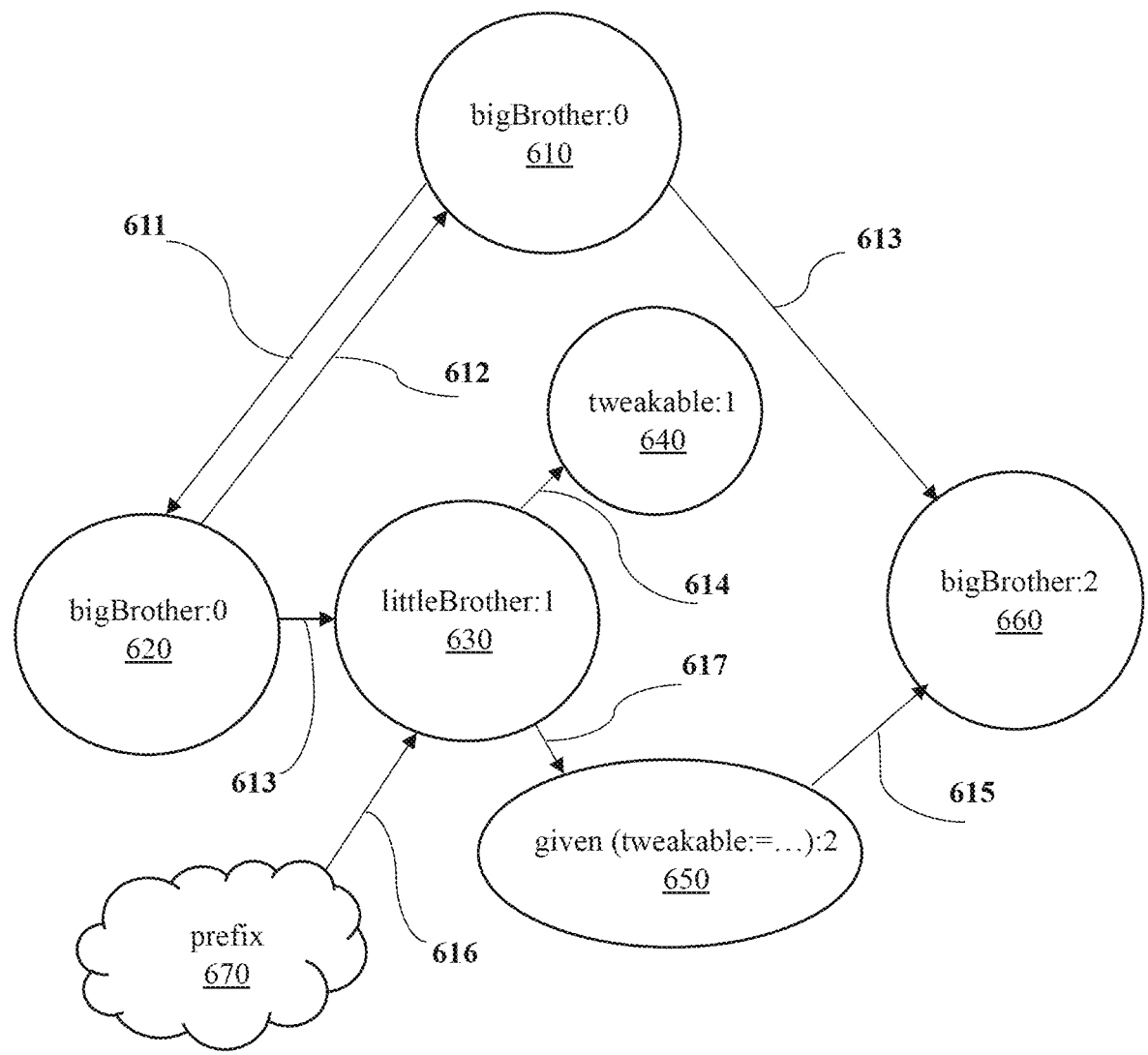
FIG. 6 illustrates, in simplified form, an example of the flow of function execution, cache reuse, and tweakable conditions within the Cross Scenario Fall Through (XSFT) system, designed to optimize performance by minimizing redundant computations herein.

FIG. 6 illustrates, in simplified form, an example of the flow of function execution, cache reuse, and tweakable conditions within the Cross Scenario Fall Through (XSFT) system, designed to optimize performance by minimizing redundant computations. The figure highlights several key processes, including the interaction between the bigBrother and littleBrother functions described in Section 0034, tweakable conditions, recursive function calls, and cache proxies. The XSFT system enhances cache reuse by focusing on Scenario reduction and optimally reuses results based on RT function behavior with respect to input parameters and scenarios.

The process begins with bigBrother 610, 620 initiating a recursive call 611 to littleBrother 630. The process 611, 612, 613 represents the function call from bigBrother 610, 620 to littleBrother 630, which checks if there are any tweakable conditions 640, 650 that might affect the result of the function. These Tweaks are tracked and modify the execution path by adjusting the Scenario, which dynamically influences the cache key. The arrows from tweakable: 1 640 and tweakable: = . . . 650 to bigBrother 610, 620 and littleBrother 630 show how these tweakable conditions impact the computation by altering the Scenario.

During the recursive execution, the system continuously checks the cache for a matching result. The cache query is based on the key that includes the function's input parameters, the Scenario, and the function name. If a matching entry is found under the same or a similar Scenario, the cached result is reused, avoiding redundant computations. This process is represented by the looping arrows between bigBrother 660 and littleBrother 630, where each recursive call checks for cache matches based on the modified Tweaks. In cases where the Scenario is reduced—meaning that some Tweaks do not affect the outcome—the cache lookup can still succeed, leading to a cache hit even when scenarios differ slightly.

If no matching cache entry is found, the system proceeds with the computation and stores a proxy entry in the cache, as indicated by the arrows flowing from bigBrother 611 and littleBrother 630 to the cache. These proxy entries store incomplete computations, which can be reused when future tasks encounter the same or overlapping Scenarios. Proxies can be entered into cache even before the function call is complete, allowing waiters to query the proxy for the result once it is ready. The system uses waiter chains, which link multiple computations that share Tweak dependencies, enabling cache reuse when a function's result is applicable across different scenarios.

The system includes cycle detection mechanisms, represented by the looping arrows between bigBrother 660 and littleBrother 630. These arrows demonstrate how the system identifies and resolves cycles that occur during recursion by reusing cached results when possible, preventing infinite loops and redundant computations. In the case of a cycle, the system applies a recovery mechanism, breaking the cycle by forcing the computation to complete, ensuring that no false dependencies block progress.

Once the computation is complete, the final result is stored in the cache, as indicated by the arrow from bigBrother 617 to the cache. This result can be reused in future tasks that share similar Tweak conditions, ensuring optimal performance by avoiding unnecessary recalculations. The system dynamically adjusts Scenarios based on the actual Tweaks that affect the function's result, further optimizing cache usage.

This implementation illustrates a comprehensive process of recursive execution, dynamic Tweak tracking, and cache reuse. The XSFT system leverages proxy entries, Scenario adjustments, and cycle detection to ensure efficient cache utilization and optimization of computational performance by minimizing redundant calculations. The system focuses on Scenario reduction-eliminating irrelevant Tweaks that do not affect the function's output-thereby improving overall efficiency. This approach ensures that even when Scenarios differ, as long as the differences do not affect the function's result, the cached result can still be reused, leading to performance improvements and reduced computational overhead.

FIG. 7 illustrates, in simplified form, an example of the XSFT system that demonstrates the management of cache reuse and task dependencies. The process starts by creating proxy entries in the cache for tasks with different input parameters. The execution of those results in different Tweaks being accessed depending on the input parameter. For instance, Node n0 720 has args=0 and a dependency on Tweak b. This dependency is represented as a long bitmask (b). The ScenarioRoot indicates that this task is executed under an empty scenario, meaning there are no additional Tweaks affecting the execution. The system stores this task as a proxy entry in the cache to ensure that if a similar task with the same dependencies is encountered later, the cached result can be reused, avoiding redundant computation.

Similarly, Node n1 725 also depends on Tweak b (again represented as long bitmask (b)), and the system generates another proxy entry with args=1. However, if an execution reads tweak a, Node n2 730 is created to represent it with args=−1 and a dependency on Tweak a (represented as long bitmask (a)). Thus, this task has its own bitmask, indicating a real dependency on a, but when the function completes, the dependencies are reported to a shared NodeTaskInfo referenced across n0, n1 and n2. This structure holds dependency information for all instances of the function, regardless of input parameters. In some implementations, this can result in a sub-optimal condition since it means that future calls to the function in a Scenario where a has changed, but b has not, will not result in cache reuse, even though calls with input parameters 0 and 1 only depend on b, not a.

The cache mechanism in FIG. 7 also shows how the system deals with more complex task dependencies. For example, when a function is executed under different tweakable conditions, the system checks the cache for potential reuse by comparing the bitmasks of active tasks. The cache stores the state of incomplete computations and allows future tasks with overlapping dependencies to use these results. In this way, the XSFT system dynamically manages tasks, reducing unnecessary evaluations by efficiently reusing cached results.

Figure 8:
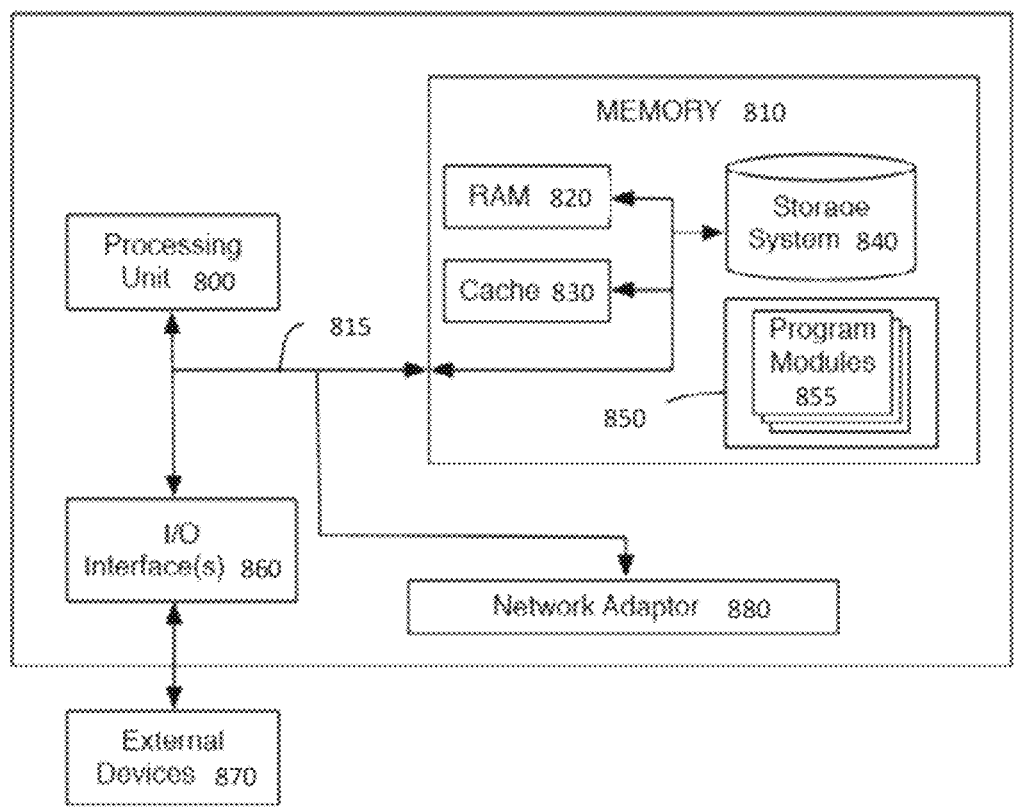
FIG. 8 is a high-level block diagram of a representative computing device that may be utilized to implement various features and processes described herein.

FIG. 8 describes various enabling devices and technologies related to the physical components and architectures described above. The computing device is illustrated in the form of a special purpose computer system. The components of the computing device may include (but are not limited to) one or more processors or processing units 800, a system memory 810, and a bus 815 that couples various system components including the memory 810 to the processor 800.

The bus 815 represents one or more of any of several types of bus structures, including a memory bus or memory controller, a peripheral bus, an accelerated graphics port, and a processor or local bus using any of a variety of bus architectures.

Processing unit(s) 800 may execute computer programs stored in memory 810. The computing device typically includes a variety of computer system readable media. Such media may be any available media that is accessible by the computing device, and it includes both volatile and nonvolatile media, removable and non-removable media.

The system memory 810 can include computer system readable media in the form of volatile memory, such as the random-access memory (RAM) 820 and/or cache memory 830. The computing device may further include other removable/non-removable, volatile/non-volatile computer system storage media. By way of example only, storage system 640 can be provided for reading from and writing to a non-removable, non-volatile magnetic media (not shown and typically referred to as a "hard drive"). In such instances, each can be connected to bus 815 by one or more data media interfaces. As will be further depicted and described below, memory 810 may include at least one program product having a set (e.g., at least one) of program modules that are configured to carry out the functions of implementation described in this disclosure.

The program/utility 850, having a set (at least one) of the program modules 855, may be stored in the memory 810 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 670 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 860.

In addition, as described above, the computing device can communicate with one or more networks, such as a local area network (LAN), a general wide area network (WAN) and/or a public network (e.g., the Internet) via network adaptor 680. As depicted, network adaptor 880 communicates with other components of the computing device via bus 815. It should be understood that although not shown, other hardware and/or software components could be used in conjunction with the computing device.

The present implementation may be a system, a method, and/or a computer program product at any possible technical detail level of integration. The computer program product may include a computer readable storage medium (or media) having computer readable program instructions thereon for causing a processor to carry out aspects of the present implementation.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. A network adapter card or network interface in each computing/processing device receives computer readable program instructions from the network and forwards the computer readable program instructions for storage in a computer readable storage medium within the respective computing/processing device.

Computer readable program instructions for carrying out operations of the present implementation may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementation, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present implantation.

Aspects of the present implementation are described herein with reference to flowchart illustrations and/or block diagrams of methods, apparatus (systems), and computer program products according to examples of the implementation. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various examples of the present implementation. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present implementation have been presented for purposes of illustration, but are not intended to be exhaustive or limited to the examples disclosed. Many modifications and variations will be apparent to those of ordinary skill in the art without departing from the scope and spirit of the described examples. The terminology used herein was chosen to best explain the principles of the examples, the practical application or technical improvement over technologies found in the marketplace, or to enable others of ordinary skill in the art to understand the examples disclosed herein.

What is claimed is:

1. A method for optimizing cache reuse in a computational system comprising:
   assigning unique identifiers to a plurality of Tweaks affecting computational outcomes;
   injecting Nodes with fields forming a bitmask representation of Tweak dependencies;
   tracking and updating the dependency information of each Node during execution;

adjusting a cache key based on the actual Tweak dependencies identified during Node execution; and storing a proxy in the cache for each executed Node under a Scenario, the proxy facilitating cache reuse by matching against other Scenarios with overlapping Tweak dependencies.

2. The method of claim 1, further comprising managing waiter chains and resolving execution cycles using a cycle detection and recovery mechanism, ensuring efficient task execution.

3. The method of claim 1, wherein the Scenario is a collection of Tweaks, which indicates the specific conditions under which a function is executed.

4. The method of claim 1, wherein the Nodes are assigned at runtime a single long field representing multiple tweakable conditions.

5. The method of claim 4, wherein the single long field injected at runtime allows the computational system to control an additional size of a Node in memory.

6. The method of claim 1, wherein the single long field on the Node create a bitmask, where a 1 at position N indicates that the Node depends on Tweak N, and a 0 indicates that it does not.

7. The method of claim 1, wherein the proxy is a cache entry for a Node under the Scenario.

8. The method of claim 1, wherein when a Node runs for a first time, its proxy is immediately inserted into the cache, even before the Node completes its execution.

9. The method of claim 1, wherein the computational system checks whether a result can be safely reused between two concurrently executing Nodes.

10. A system for optimizing cache reuse in a computational system comprising:

a computing device comprising at least one processor and non-transitory memory storing first software instructions for a code execution module such that, when the first software instructions are executed by the at least one processor, the at least one processor is configured to:

assign unique identifiers to a plurality of Tweaks affecting computational outcomes;

inject Nodes with fields forming a bitmask representation of Tweak dependencies;

track and update the dependency information of each Node during execution;

adjust a cache key based on the actual Tweak dependencies identified during Node execution; and store a proxy in the cache for each executed Node under a Scenario, the proxy facilitating cache reuse by matching against other Scenarios with overlapping Tweak dependencies.

11. The system of claim 10, the at least one processor further comprising managing waiter chains and resolving execution cycles using a cycle detection and recovery mechanism, ensuring efficient task execution.

12. The system of claim 10, wherein the Scenario is a collection of Tweaks, which indicates specific conditions under which a function is executed.

13. The system of claim 10, wherein the Nodes are assigned at runtime a single long field representing multiple tweakable conditions.

14. The system of claim 13, wherein the single long field injected at runtime allows the computational system to control an additional size of a Node in memory.

15. The system of claim 10, wherein the single long field on the Node create a bitmask, where a 1 at position N indicates that the Node depends on Tweak N, and a 0 indicates that the Node does not.

16. The system of claim 10, wherein the proxy is a cache entry for a Node under the Scenario.

17. The system of claim 10, wherein when a Node runs for a first time, its proxy is immediately inserted into cache, even before the Node completes its execution.

18. The system of claim 10, wherein the computational system checks whether a result can be safely reused between two concurrently executing Nodes.

* * * * *